（12）United States Patent
Maillart (10) Patent No.: US 10,072,978 B2
(45) Date of Patent: Sep. 11, 2018

(54) LIGHT-RAY DETECTION CIRCUIT (71) Applicant: SOCIÉTÉ FRANÇAISE DE DÉTECTEURS INFRAROUGES—SOFRADIR, Palaiseau (FR)

(72) Inventor: Patrick Maillart, La Murette (FR)

(73) Assignee: SOCIÉTÉ FRANÇAISE DE DÉTECTEURS INFRAROUGES-SOFRADIR, Palaiseau (FR)

( * ) Notice: Subject to any disclaimer, the term of this patent is extended or adjusted under 35 U.S.C. 154(b) by 0 days.

(21) Appl. No.: 15/124,079

(22) PCT Filed: Mar. 6, 2015

(86) PCT No.: PCT/FR2015/050553
§ 371 (c)(1),
(2) Date: Sep. 7, 2016

(87) PCT Pub. No.: WO2015/132539
PCT Pub. Date: Sep. 11, 2015

(65) Prior Publication Data
US 2017/0016765 A1 Jan. 19, 2017

(30) Foreign Application Priority Data
Mar. 7, 2014 (FR) ...................... 14 00561

(51) Int. Cl.
H01J 40/14 (2006.01)
G01J 1/46 (2006.01)
H02J 7/00 (2006.01)
H02J 7/34 (2006.01)

(52) U.S. Cl.
CPC ............... *G01J 1/46* (2013.01); *H02J 7/0021* (2013.01); *H02J 7/345* (2013.01)

(58) Field of Classification Search
CPC .. H02J 7/0021; H02J 7/345; G01J 1/44; G01J 1/46
USPC ........... 250/214 R, 214 SW; 348/308
See application file for complete search history.

(56) References Cited

U.S. PATENT DOCUMENTS 6,201,573 B1* 3/2001 Mizuno ................ H04N 3/1512
250/208.1
8,493,096 B1* 7/2013 Buescher ........... G01R 19/1659
327/50
2006/0158542 A1 7/2006 Mizuno et al.

FOREIGN PATENT DOCUMENTS

WO 2004/074789 A1 9/2004

OTHER PUBLICATIONS

May 27, 2015 International Search Report issued in International Patent Application No. PCT/FR2015/050553.

* cited by examiner

Primary Examiner — Kevin Pyo
(74) Attorney, Agent, or Firm — Oliff PLC (57) ABSTRACT The circuit of detection of light radiation includes a photodetector. The photodetector is coupled to three capacitors by means of three switches. The capacitors are parallel mounted to form a capacitive load whose value of electrical capacity changes as a function of the openings/closures of the switches. This configuration allows to stabilize the voltage present on the output terminal in the detection circuit for a wider range of illumination sustained by photodetector.

11 Claims, 10 Drawing Sheets

LIGHT-RAY DETECTION CIRCUIT

TECHNICAL FIELD OF THE INVENTION

The invention relates to a detection circuit with several conversion gains.

STATE OF THE ART

In a conventional way, when a scene is observed by an opto-electronics device containing one or several photodetectors, each photodetector detects the light radiation and delivers a current proportional to the portion of the scene observed. The current from the photodetector is integrated by means of a capacitor for a preset time period. Thus, at the end of this period, each pixel provides information on the portion of the scene observed. The detector can be assimilated to a current generator, the charge Q accumulated in the capacitor can be formulated in the following manner: Q=I.t where
Q represents the charge in the capacitor,
I represents the current to the terminals of the capacitor,
t represents the charging time.

The quantity of the charge Q accumulated in the capacitor induces appearance of a potential difference at its terminals which can be formulated in the following manner: V=Q/C where
C represents the electrical capacity of the capacitor,
V represents the potential difference at the terminals of the capacitor.

The state of an observed scene may therefore be followed by means of the voltage at the terminals of a capacitor connected to the detector.

In a classic way, the current issued by the light radiation detector passes through a transistor control, in general an electronic switch, and reaches the capacitor. The transistor control is a biasing transistor that is used to bias the photodetector in an appropriate manner. These elements are connected between ground and a first input terminal of a differential amplifier. A first terminal of the capacitor is connected to the biasing transistor and to one terminal of the amplifier. A second terminal of the capacitor is connected directly to the first input terminal of the amplifier and to a reference potential. The comparator is then able to provide on its output terminal S information on the voltage at the terminals of the capacitor.

Classically, during the realisation of an integrated circuit or a pixel, the characteristic dimensions of the various components are limited by the design rules and compatibility. All the elements of the detection device are therefore configured to propose maximum operating in the range of intended use. Therefore, the detection device is configured to operate in a predefined illumination range, (i.e. with luminous intensity data). If the device is used outside of the conditions laid down, for example with a lower illumination, significant noise may be introduced by the detection device. If the illumination is more significant, the integration capacitor is saturated and it is difficult to distinguish between the present different conditions of illumination.

OBJECT OF THE INVENTION

The object of the invention is a detection circuit that is easy to implement, compact and which provides information with a high signal-to-noise ratio on a more extended illumination operational range.

The circuit according to the invention includes:
a photodetector,
a biasing circuit configured to bias the photodetector,
an integration capacitive load configured to store electrical charges emitted by the photodetector,
an output terminal coupled to the integration capacitive load and designed to be connected to a processing circuit,
at least first and second transit lines mounted in branches between the photodetector and the output terminal, the first transit line comprising first and second switches mounted in series, the second transit line comprising third and fourth switches mounted in series,
a first capacitor having an electrode connected between the first and second switches and a first source of predefined voltage,
a second capacitor having an electrode connected between the third and fourth switches and a second source of predefined voltage,
a third capacitor mounted in series with a specific switch between a third source of predefined voltage and the connection between the first switch and the third switch,
means for resetting the first, second and third capacitors independently In a particular embodiment of the invention, the circuit comprises means for controlling the switches configured so that
the charges emitted by the photodetector are stored in the third capacitor,
the stored charges are transferred in the first capacitor,
the third capacitor is reset,
the charges emitted by the photodetector are stored in the third capacitor,
the stored charges are transferred in the first capacitor and second capacitor mounted in parallel,
and the processing circuit reads the information recorded in the first capacitor and the information stored in the first and second capacitors.

In another particular embodiment of the invention, the circuit comprises means for controlling the switches configured so that
the charges emitted by the photodetector are stored in the third capacitor,
the stored charges are transferred in the first capacitor,
the third capacitor is reset,
the charges emitted by the photodetector are stored in the third capacitor,
the stored charges are transferred in the second capacitor,
in that it comprises the reading of the information stored in the first capacitor during at least one portion of the storage of charges in the second capacitor and the reading of the information stored in the second capacitor during at least one portion of the storage of charges in the first capacitor.

SUMMARY DESCRIPTION OF THE DRAWINGS

Other advantages and characteristics will emerge more clearly in the following description of particular embodiments of the invention given as non-limiting examples and represented in the appended drawings, in which.

DESCRIPTION OF A PREFERRED EMBODIMENT OF THE INVENTION

Figure 1:
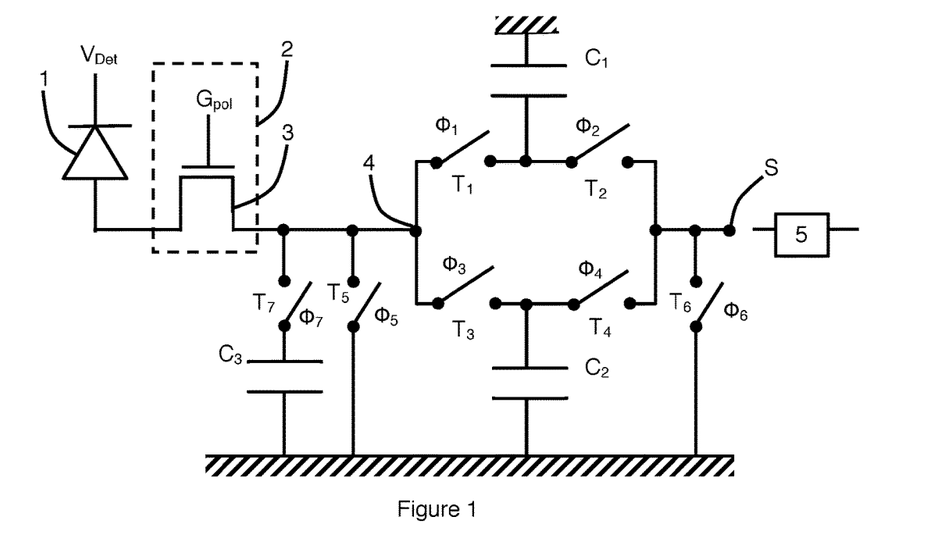
FIG. 1 represents schematically a specific detection circuit according to the invention.

As illustrated in FIG. 1, the detection circuit classically includes a detector 1 of light radiation, i.e. a device called photodetector that transforms light radiation into an electrical current also.

The photodetector 1 is biased by means of a biasing circuit 2. A biasing potential $V_{Det}$ is supplied on one of the terminals of photodetector 1. The other terminal of photodetector 1 is biased by means of the biasing circuit 2. The photodetector 1 acts as a source of current.

In a particularly advantageous embodiment, the biasing circuit 2 is of direct injection type. The photodetector 1 is connected in series with a biasing transistor 3. It is also possible to use a buffered direct injection biasing circuit.

The photodetector 1 is electrically coupled to a capacitive load also called a storage node 4. The integration capacitive load 4 is configured to store electrical charges emitted by the photodetector. The storage node 4 is materialised on FIG. 1 by the electrical node coupling three distinct capacitors by means of three distinct switches. Each of the three capacitors is connected to the storage node 4 by means of a specific switch that can be operated independently of the other switches.

A first electrode of different capacitors is electrically coupled with the storage node 4. The second electrode is coupled to a source of specific potential. In order to facilitate the operation of the circuit, it is advantageous to apply the same potential on all second electrodes of capacitors. In the embodiments illustrated, the second electrodes are grounded.

The capacitive load 4 is coupled electrically to a terminal output S of the detection device by means of two branch-mounted transit lines. The output terminal S coupled to the integration capacitive load 4 is designed to be connected to a processing circuit 5.

Each of the two transit lines has two switches series mounted between the photodetector 1 and the output terminal S. The two switches operate independently in same transit line and they operate independently of the other two switches mounted in the other transit line.

The first transit line comprises first and second switches T1 and T2 series mounted and which are controlled respectively by the signals φ1 and φ2.

A first capacitor C1 is connected between the first and second switches T1, T2 and a first source of predefined voltage. In other words, the first capacitor C1 has one of its electrodes coupled to the first transit line between the first and second switches T1 and T2. The other electrode is coupled to the first source of predefined voltage.

The second transit line comprises of third and fourth switches T3 and T4 series mounted and which are controlled respectively by the Signals φ3 and φ4.

A second capacitor C2 is connected between the third and fourth switches T3, T4 and a second source of predefined voltage. In other words, the second capacitor C2 has one of its electrodes coupled to the second transit line between the third and fourth switches T3 and T4. The other electrode is coupled to the second source of predefined voltage.

A third capacitor C3 is series mounted with a specific switch between a third source of predefined voltage and the connection between the first switch T1 and the third switch T3. The third capacitor C3 is advantageously placed between the photodetector 1 and the node common to the two transit lines. Advantageously, the third capacitor C3 is placed between the biasing circuit 2 and the node common to the two transit lines. The third capacitor C3 can be coupled electrically with photodetector 1 by means of a specific switch.

The device further comprises means for resetting the first, second and third capacitors independently. In a particular embodiment, the means of resetting are formed by switches mounted in parallel to the capacitors. Other more advantageous embodiments, since they are more compact, will be presented thereafter.

During a phase of acquisition, the photodetector 1 emits electrical charges which are stored in the storage Node 4. More specifically, the electrical charges are stored in at least one of the electrodes of the capacitors C1, C2, and C3 as a function of the status of the associated switches.

This configuration is particularly advantageous because the range of accessible voltage on the output terminal S can be maintained in a predefined range while the conditions of illumination may vary on a broader range. This specificity allows to connect the output to a single processing circuit 5 which is configured to receive the stored signal in the defined voltage range.

This configuration with three capacitors allows to form a capacitive load 4 with at least five different values of electrical capacity. In other words, the storage node 4 can be formed by at least five capacitors or assemblies of capacitors with different values of gain to maintain the voltage on the output terminal S in the predefined range.

Once the charges are stored in the storage node 4, the latter are read by the processing circuit 5 in the form of a voltage.

Figure 2:
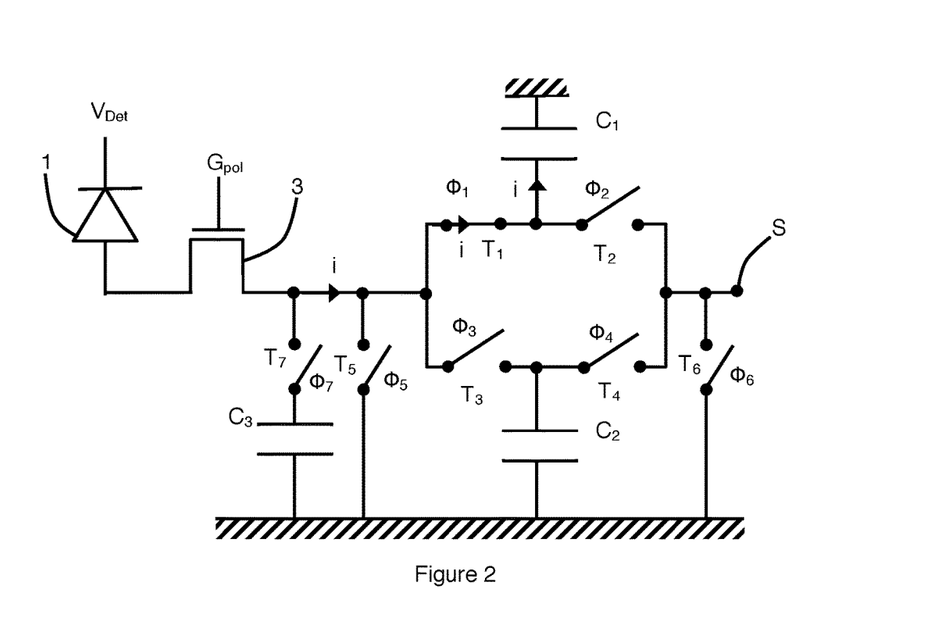
FIGS. 2 and 3 represent, schematically, a specific first mode of operation of a detection circuit according to the invention.

In first period of first configuration illustrated in FIG. 2, the first switch T1 is closed to allow the transfer of electrical charges from photodetector 1 towards the first capacitor 1. Electrical charges are represented by the current i. The third switch T3 is open to prevent a transfer of charges towards the second capacitor C2.

The second switch T2 can be closed or open during the phase of the transfer of the charges to the first capacitor C1. If the second switch T2 is closed, the fourth switch T4 is open to prevent a transfer of charges towards the second capacitor C2.

Figure 3:
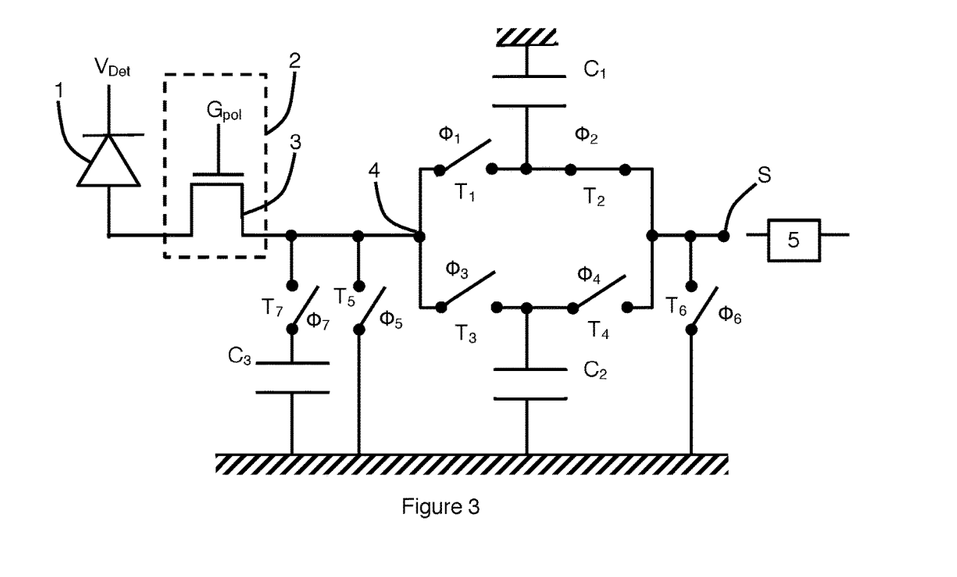

Then as illustrated in FIG. 3, the voltage at the terminals of the first capacitor C1 acting as storage node 4 is measured by the processing circuit 5. During the phase of voltage reading, the second switch T2 is closed. The first switch T1 is advantageously open in order not to distort the reading by introducing new electrical charges. It is also advantageous to open the third switch T3.

After the reading phase, the information stored in the first capacitor C1 is erased by short circuiting the terminals of the first capacitor C1.

In this first configuration, the information is firstly stored in first capacitor C1 to then be read by the processing circuit 5. Then the information is erased.

Advantageously, the first, second and third sources of predefined voltage are configured to deliver the same voltage. Then it is preferable that the means for resetting the first, second and third capacitors include a fifth switch connected in parallel to the series circuitry formed by the third capacitor C3 and the specific switch. It is also advantageous that the means for resetting include a sixth switch T6 connected between the source of the predefined voltage and the output terminal or between the source of the predefined voltage and one of the transit lines associated with its capacitor.

To erase the data stored in capacitor C1, it is particularly advantageous to connect the electrode coupled to storage node 4 with the potential applied on the other electrode. In a particularly advantageous configuration, the other electrode is coupled to the source of specific potential (here ground) by means of a switch.

For example, it is possible to connect a fifth switch T5 between the source of the specific potential and the terminal common to the two transit lines and coupled to the storage node 4, that is to say on the side of the photodetector 1. In variant, it is possible to connect a sixth switch T6 between the source of the specific potential and the terminal common to the two transit lines coupled to the processing circuit 5.

The fifth and sixth switches T5 and T6 are activated respectively by the signals $\phi_5$ and $\phi_6$.

Resetting the first capacitor C1 is performed by simultaneously activating the first and fifth transistors T1 and T5 and/or simultaneously activating the second and sixth transistors T2 and T6. In this embodiment, the gain is q/C1 with q representing a given electrical charge and C1 the value of electrical capacity of the first capacitor C1. The gain is expressed in V/electron.

This mode of operation is said ITR (Integration Then Read) because to save new data in the storage node 4, the data from the previous acquisition must have been read previously.

In variant, it is possible to do the same with storage in the second capacitor C2. The actuations of the first and third switches are interchanged. It is the same for the second and fourth switches. This embodiment is not illustrated.

If the second capacitor C2 presents a value of electrical capacity different from the electrical capacity value of the first capacitor C1 this allows to form a storage node with a different gain of what is obtained with capacitor C1. In this embodiment, the gain is q/C2 with q representing a given electrical charge and C2 the value of electrical capacity of second capacitor C2.

Resetting the second capacitor C2 is obtained by simultaneously activating the third and fifth transistors T3 and T5 and/or simultaneously activating the fourth and sixth transistors T4 and T6.

In another mode of operation, it is possible to operate the detection circuit with a greater reading frequency without degrading the performances. In this mode of operation, the data are stored alternately between the first capacitor C1 and the second capacitor C2. The reading of the stored data is also performed alternately, offset by half a period so that the reading of the information stored in the first capacitor C1 is done during the writing of data in the second capacitor C2.

Then, the reading of the information stored in the second capacitor C2 is carried out during the writing of data in the first capacitor C1.

This embodiment is particularly useful if the first and second capacitors C1 and C2 have the same value of electrical capacity. In this case, the processing circuit 5 ignores the information on the capacitor being read. In the case where the values of electrical capacity of two capacitors are different, processing is possible with correcting the read data value with an algorithm in the processing circuit. It must then inform the processing circuit with additional data indicating if the reading is carried out on the first or the second capacitor in order to assign the correct value of electrical capacity.

In a particularly advantageous mode of operation, the process can be described in the following manner.

Figure 4:
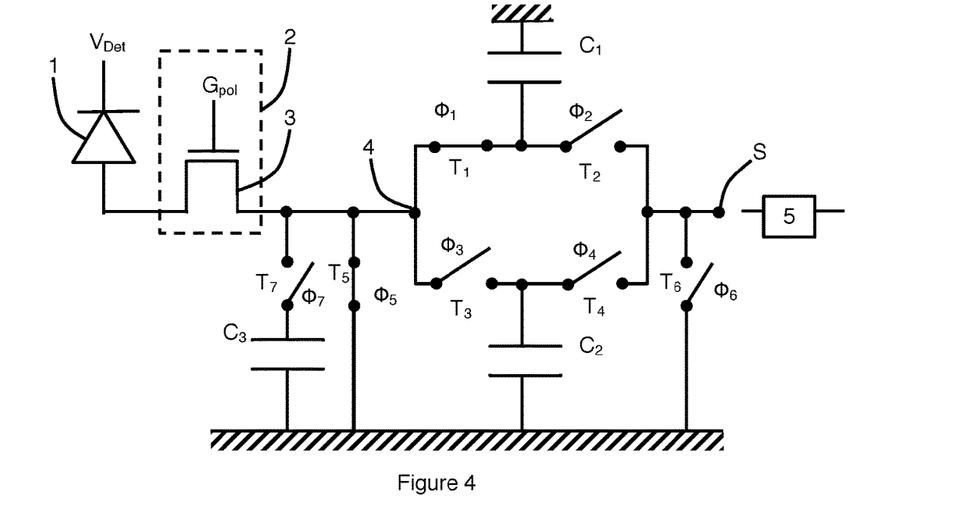
FIGS. 4 to 7 represent different stages of a second mode of operation of a detection circuit according to the invention.

In a first time period illustrated in FIG. 4, the electrical charges present in the first capacitor C1 are erased. The reset is performed by closing simultaneously the first and fifth switches T1 and T5. The third switch T3 is open.

Figure 5:
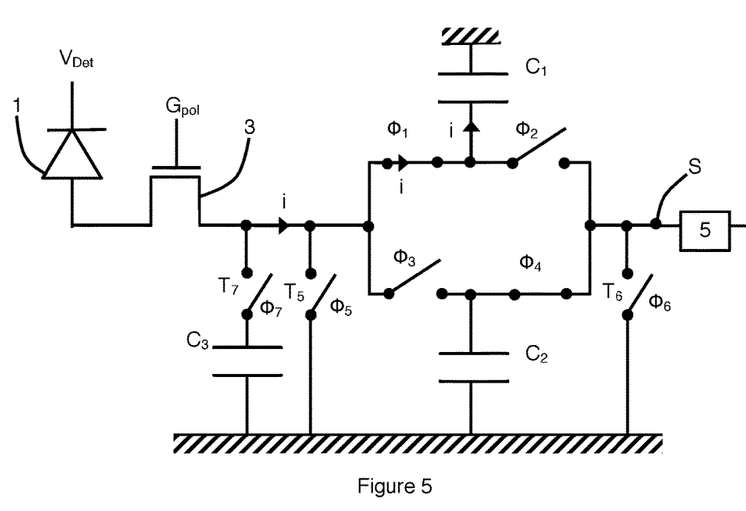

In a second time period illustrated in FIG. 5, the electrical charges provided by the photodetector 1 are stored in the first capacitor C1. The first switch T1 is closed. The third switch T3 is open. During the second time period or during at least one portion of this second period, it is advantageous to open the second switch T2 and close the fourth switch T4 so as to allow the reading of the information stored in the second capacitor C2.

Figure 6:
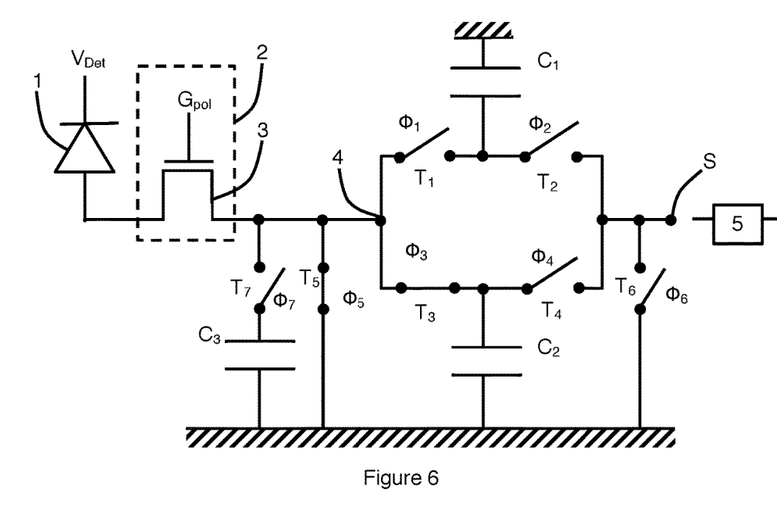

In a third time period illustrated in FIG. 6, the electrical charges present in the second capacitor C2 are erased. The reset is performed by closing simultaneously the third and fifth the switches T3 and T5. The first switch T1 is open.

Figure 7:
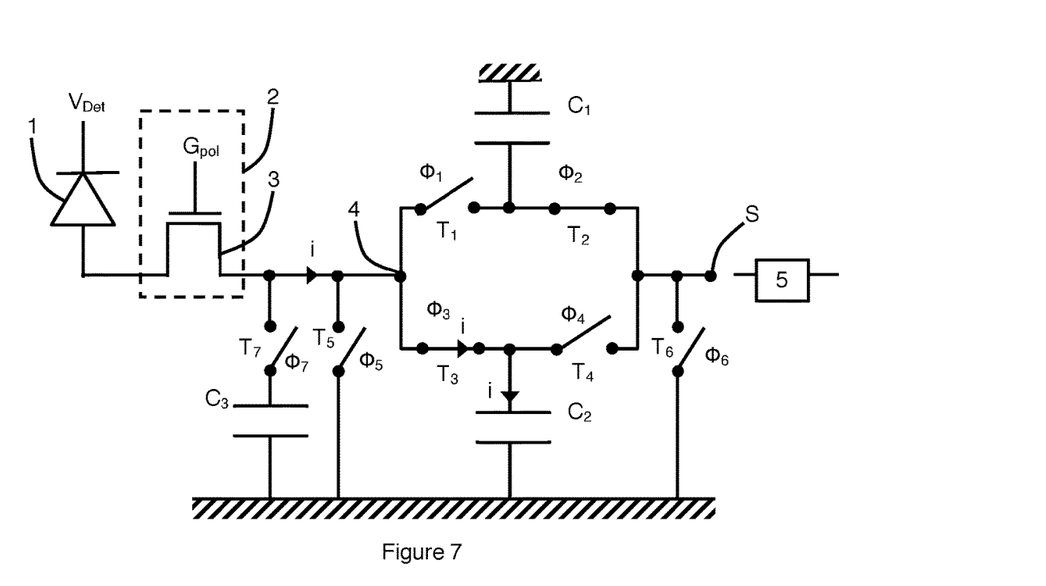

In a fourth time period illustrated in FIG. 7, the electrical charges provided by the photodetector 1 are stored in the second capacitor C2. The third switch T3 is closed. The first switch T1 is open. During the fourth time period or during at least one portion of this fourth period, it is advantageous to close the second switch T2 and to open the fourth switch T4 to allow the reading of the information stored in the first capacitor C1.

In variant, the reading of the data in the capacitor C1 is separated from the acquisition carried out in the capacitor C2 and vice versa.

In another mode of operation, it is possible to operate the device with a different gain by connecting in parallel the first and second capacitors C1 and C2.

In this configuration, the two capacitors C1 and C2 are connected to node 4 and receive the charges emitted by photodetector 1. Then the stored information is read by processing circuit 5 and the information is erased to allow new storage of electrical charges in the capacitors C1 and C2.

The first and third switches T1 and T3 can receive the same signal to operate in synchronism. It may be the same for the second and fourth switches T2 and T4.

Figure 8:
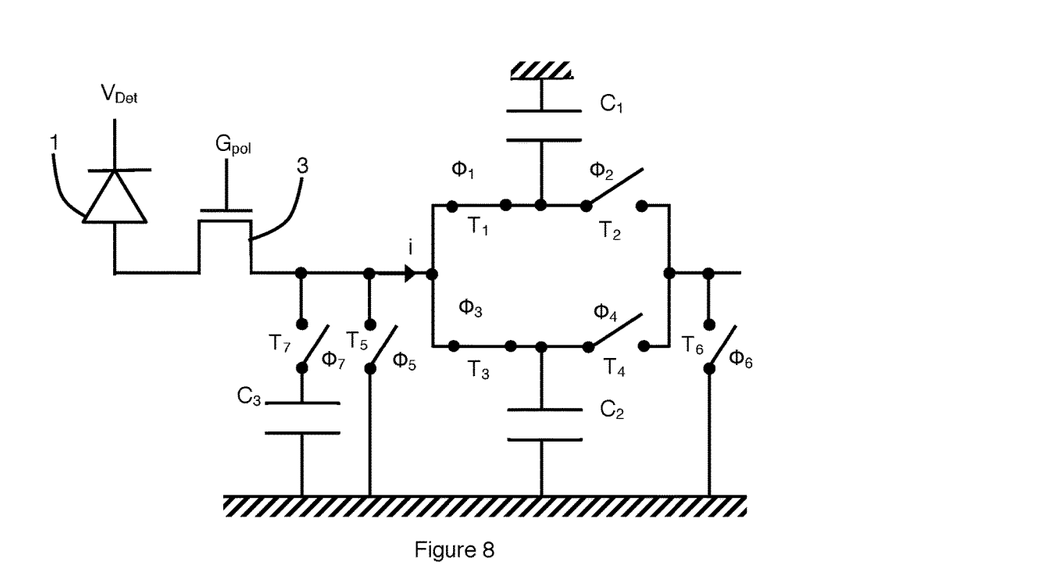
FIGS. 8 to 10 represent, schematically, a specific third mode of operation of a detection circuit according to the invention, the FIGS. 11 to 13 represent, schematically, a specific fourth mode of operation of a detection circuit according to the invention, the FIGS. 14 to 17 represent, schematically, a specific fifth mode of operation of a detection circuit according to the invention.

During a first period illustrated in FIG. 8, the first switch T1 is closed which allows the transit of electrical charges from photodetector 1 toward the first capacitor C1. During the first period or at the end of the first period, the third switch T3 and/or the second and fourth switches are closed to allow a transit of electrical charges toward the second capacitor C2. In this way, there is a balance of electrical charges between capacitors C1 and C2.

Advantageously, the third switch T3 is closed during the whole of the first period or at the end of the first period.

Figure 9:
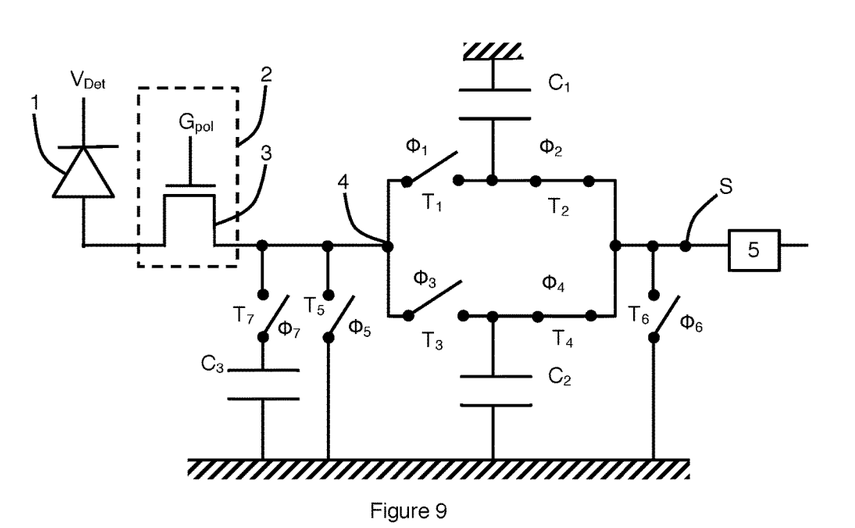

In a second period illustrated in FIG. 9, the information stored in capacitors C1 and C2 is read by the processing circuit 5. The second switch T2 and/or the fourth switch T4 are closed. The capacitors C1 and C2 act as storage node 4.

Advantageously, during the second period, the first switch T1 and the third switch T3 are open to avoid a transfer of electrical charges from photodetector 1.

Figure 10:
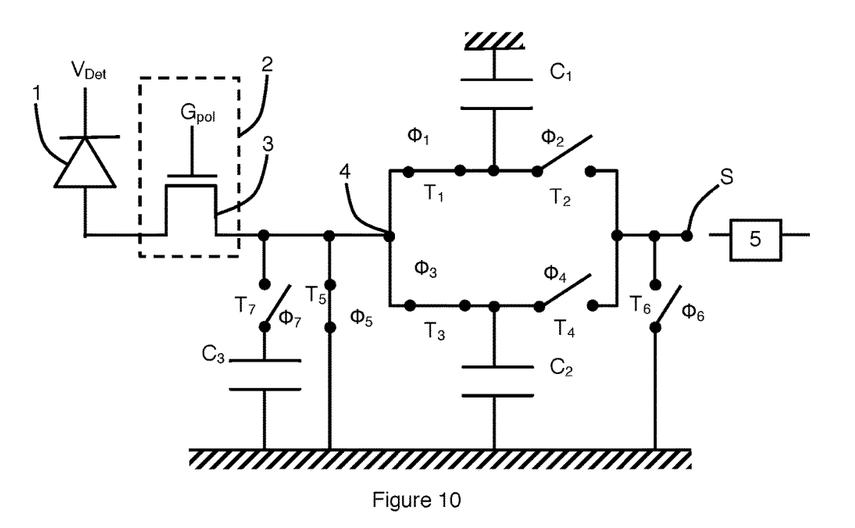

In a third period illustrated in FIG. 10, electrical charges stored in capacitors C1 and C2 are eliminated. The reset of the capacitors may be carried out by simultaneously closing the first and the third switches T1 and T3 and by closing the fifth switch T5.

In an alternative embodiment not represented, the first switch T1 or the third switch T3 is closed at the same time as the second and fourth switches T2 and T4 to reset the capacitors C1 and C2. The fifth switch T5 is also closed.

The reset can also be carried out by means of the closure of the sixth switch T6. In this case, the operation described for the first and third switches is transposed to the second and fourth switches and vice versa.

In this embodiment, the gain of the storage node is q/(C1+C2).

Whereas in the preceding embodiments, the third capacitor C3 was decoupled from the photodetector, in another mode of operation, the third capacitor C3 is coupled electrically to the storage node by means of a seventh switch T7.

In the illustrated embodiments, the third capacitor C3 is connected between the photodetector 1 and the node connected to the two transit lines.

Figure 11:
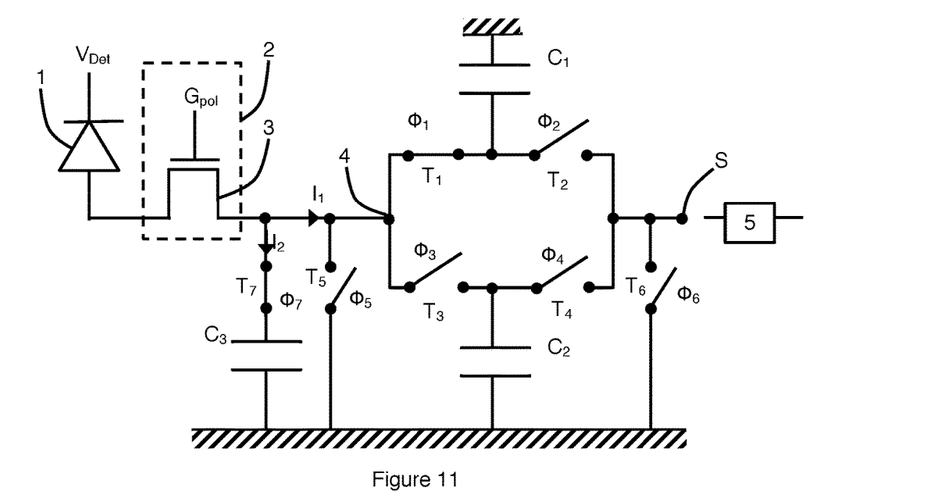

During a first time period illustrated in FIG. 11, the first and the seventh switches T1 and T7 are closed which allows a storage of electrical charges in the capacitors C1 and C3. The two capacitors are parallel mounted. It is particularly advantageous to have a third capacitor C3 which presents a value of electrical capacity markedly superior to the value of electrical capacity of the first capacitor C1. Advantageously, the ratio of capacity between capacitors C1 and C3 is between 1 and 4 with a preference between 2 and 3. The electrical capacity of the capacitor C1 can be lower or greater than that of the capacitor C3. It may be the same between capacitors C2 and C3.

The third and fourth switches are open to avoid a transit of electrical charges towards the second capacitor C2. The fourth switch T4 can be closed if the second switch T2 is open and vice versa.

During the transfer of electrical charges from photodetector 1, there is a balance of charges between capacitors C1 and C3. The two capacitors share the same information.

Figure 12:
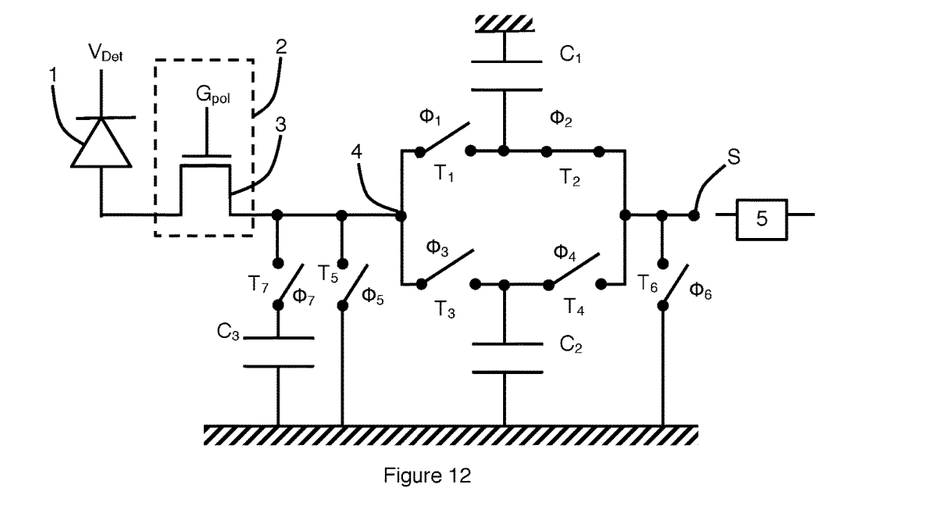

In a second period illustrated in FIG. 12, the first switch T1 is opened and the information stored in the first capacitor C1 is read by the processing circuit 5. The second switch T2 is closed.

During the second period, the fourth switch T4 is open.

During the reading, processing circuit 5 does not have access to the third capacitor C3, the state of the seventh switch T7 is not important.

Figure 13:
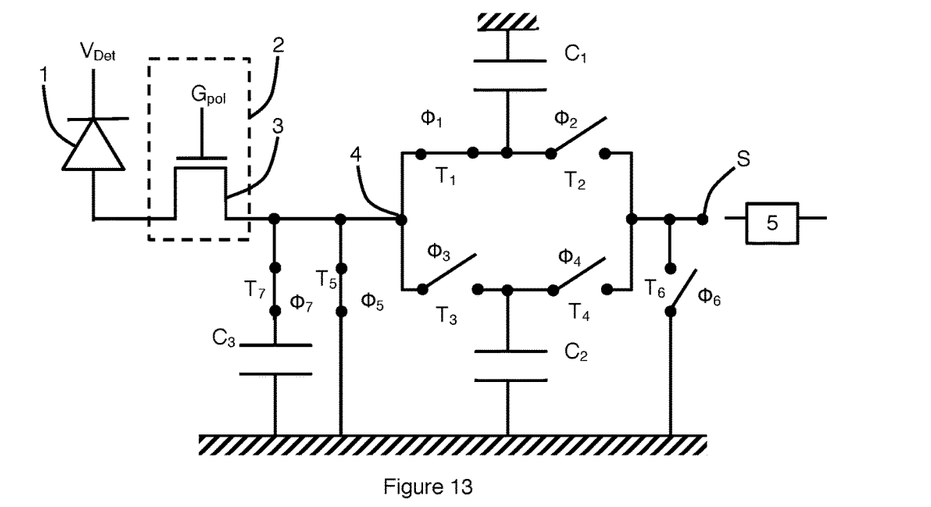

Once the reading is performed, the information stored in the two capacitors C1 and C3 is deleted. Resetting can be performed by simultaneously closing the first switch T1, the fifth switch T5 and the seventh switch T7 as represented in FIG. 13. In variant, it is possible to achieve the reset by simultaneously closing the first switch T1, the second switch T2, the sixth switch T6 and the seventh switch T7. It is also possible to close the fifth and seventh switches on one side and close the second and the sixth switches on the other side. The first switch T1 can be placed to the closed or open state.

It is possible to operate the detection circuit with a greater frequency reading without performance degradation by storing the data alternately between the first capacitor C1 and the second capacitor C2. The reading of the stored data is also performed alternately, offset by half a period so that the reading of the information stored in the first capacitor C1 is carried out during the writing of the data in the second capacitor C2. Then, the reading of the information stored in the second capacitor C2 is carried out during the writing of the data in the first capacitor C1.

As previously, this embodiment is particularly useful if the first and second capacitors C1 and C2 are of the same value of electrical capacity. In this case, processing circuit 5 ignores the information on the capacitor that is read. In cases where values of electrical capacity of two capacitors C1 and C2 are different, the processing is possible by correcting the data value read by an algorithm in processing circuit 5. One must then inform the processing circuit 5 with supplementary data indicating if the reading is carried out on the first capacitor or on the second capacitor in order to assign the correct value of electrical capacity.

In a particularly advantageous method of operation, the process can be described in the following manner.

Figure 14:
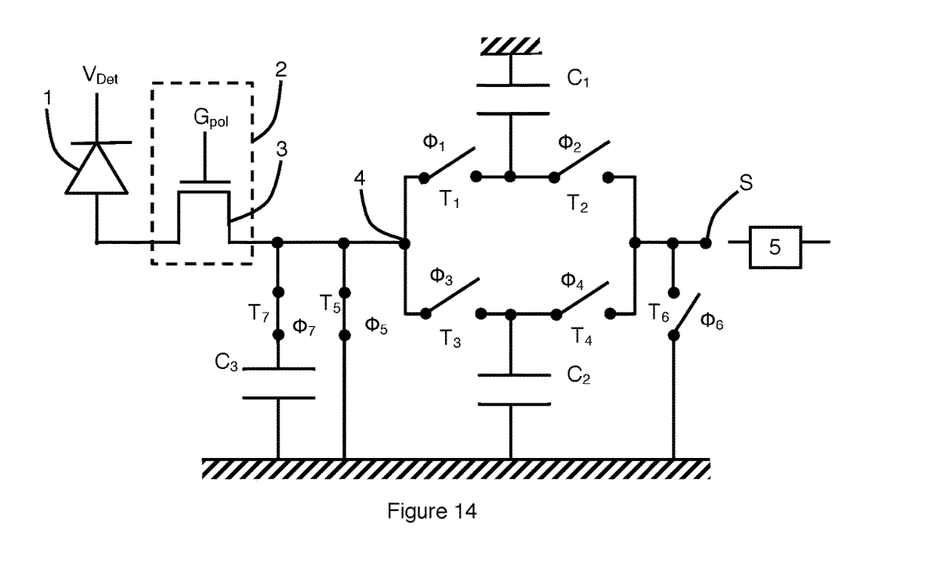

During a first time period illustrated in FIG. 14, the third capacitor C3 is reset by simultaneously closing the fifth and seventh switches T5 and T7. The first switch T1 is open.

Figure 15:
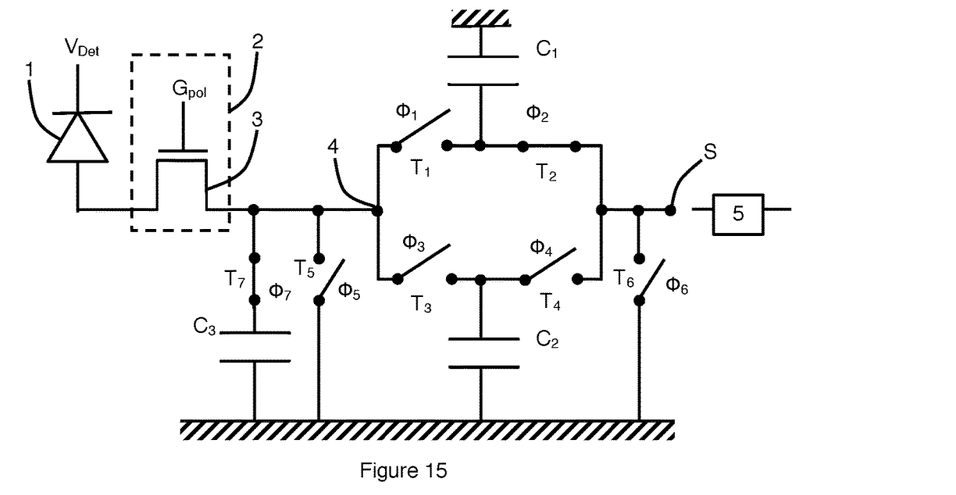

In a second time period illustrated in FIG. 15, the seventh switch T7 is closed and the first and third switches T1 and T3 are open which allows a storage of electrical charges in capacitor C3 only. The acquisition of data on an observed scene is made within capacitor C3.

During at least one portion of the second time period, the second switch T2 is closed which allows the reading of information stored previously by the processing circuit 5 in capacitor C1.

Figure 16:
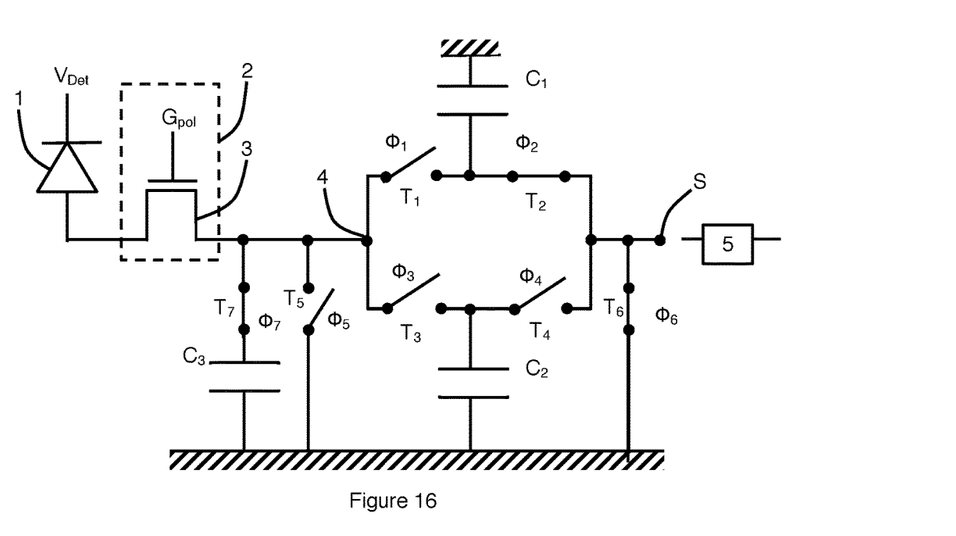

In a third period illustrated in FIG. 16, following this reading, the information stored in the first capacitor C1 is erased by closing the sixth switch T6 simultaneously with the second switch T2. The first switch T1 is opened in order not to erase the data present in the third capacitor C3. It is advantageous to continue the acquisition of data in capacitor C3.

Figure 17:
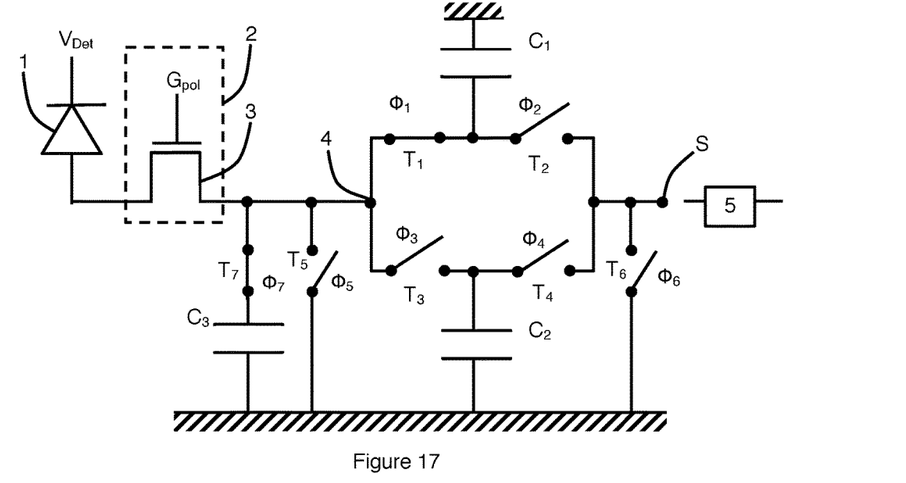

In a fourth period illustrated in FIG. 17, the first switch T1 is closed at the same time that the seventh switch T7 to achieve a balance of charges between the capacitors C1 and C3. The information contained in capacitor C3 is shared with capacitor C1.

In a new first period, the first switch T1 is then opened and the third capacitor C3 is reset.

The acquisition of data originating from photodetector 1 is achieved on the third capacitor C3 and the information is then shared with first capacitor C1. The reading of the information by processing circuit 5 is then performed on the first capacitor C1. As previously indicated, the reading is carried out during at least one portion of the second time period. In this mode of operation, a reading phase is carried out at the same time as an acquisition phase. The reading and the acquisition are performed on different capacitors.

The second capacitor C2 is not connected to the first capacitor C1, nor to the third capacitor C3. For example, during the different periods, the third switch T3 is open to avoid charging the second capacitor C2.

In this mode of operation, the gain is q/(C1+C3).

In a particular case, although the second capacitor C2 is not used to store data, it is advantageous to carry out a reset of the capacitor C2. This reset allows to periodically impose the potential of the capacitor not used and to avoid the presence of floating potential in the circuit, a source of random failure difficult to detect.

An example of operation is the following.

The seventh switch T7 is continuously closed. The second switch T2 is continuously closed. The third switch is continuously open.

The reset of capacitor C1 is achieved by closing the sixth transistor T6. During the reset of capacitor C1, the fourth transistor T4 is closed to reset capacitor C2.

After the reset of second capacitor C2, the fourth switch T4 is open. Then, the first switch T1 is closed to balance the first and third capacitors. The processing circuit is then able to read the information on first capacitor C1.

In an alternative embodiment, capacitor C2 is reset during the reset of third capacitor C3. The reset of second capacitor C2 can be achieved by simultaneously closing the third switch T3 and the fifth switch T5.

In the previous embodiments, the reading on capacitor C1 is achieved during the acquisition on capacitor C3 that allows a higher acquisition frequency. It is possible to reach slower acquisition frequencies by increasing the resetting time of the capacitor C3. It is then advantageous to reset capacitor C3 at least throughout the phase of reading of capacitor C1. In this way, an acquisition of data is followed by a phase of reading. The following acquisition phase is achieved only after the end of the reading of the data.

Another mode of operation may be obtained by transferring the charges accumulated in capacitor C3 towards capacitor C2. The gain of this operating mode is $q/(C3+C2)$. The actuations of the first and third switches are inverted. It is the same for the actuations of the second and fourth switches. This embodiment is not represented.

If capacitors C1 and C2 have different values of electrical capacity. The detection device may propose two different values of gain $q/(C3+C1)$ or $q/(C3+C2)$.

In a new mode of operation, a new gain is obtained by coupling electrically the capacitors C1, C2 and C3. The gain is then $q/(C1+C2+C3)$.

As previously, the acquisition phase is carried out by storing the charges in capacitor C3 and then by performing a balance of the charges with capacitors C1 and C2. The reading is then carried out by reading the voltage on capacitors C1 and C2 or on one of the capacitors C1 and C2.

The operation can be described in the following way, during a first time period, the third capacitor C3 is reset by simultaneously closing the fifth and seventh switches T5 and T7. This step is illustrated in FIG. 14.

In a second time period, the seventh switch T7 is closed and the first and third switches T1 and T3 are open which allows a storage of electrical charges in capacitor C3 only. This step is illustrated in FIG. 15.

During at least one portion of the second time period, the second switch T2 is closed which allows the reading of information previously stored by processing circuit 5 in capacitors C1 and/or C2.

Following this reading, the information stored in first capacitor C1 and in second capacitor C2 is erased by closing sixth switch T6 simultaneously with second switch T2 and fourth switch T4. The first switch T1 is opened in order not to erase data present in third capacitor C3. It is also possible to erase data on first capacitor C1 and then data of the second capacitor C2 or vice versa.

Figure 18:
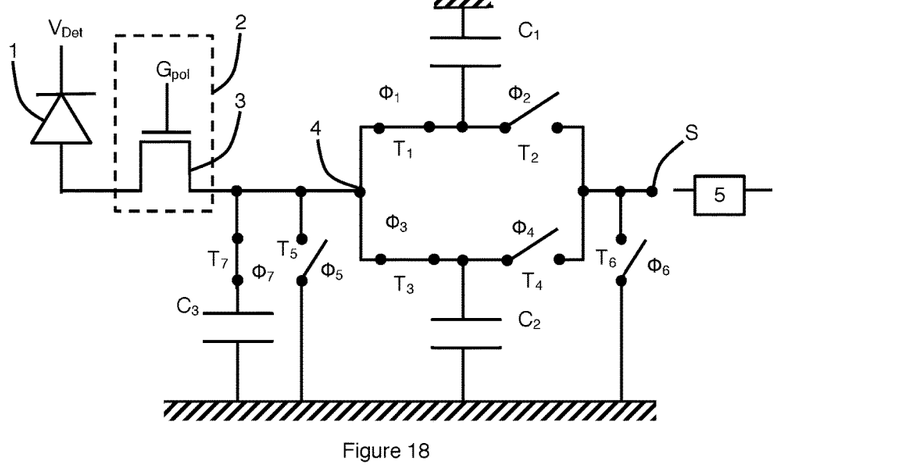
FIG. 18 represents, schematically, a specific sixth mode of operation of a detection circuit according to the invention.

In a third period illustrated in FIG. 18, the first switch T1 and the third switch T3 are closed at the same time as the seventh switch T7 so as to achieve a balance of charges between capacitors C1, C2 and C3.

The connection of third capacitor C3 with the first and second capacitors C1 and C2 can be performed by closing simultaneously the first switch T1, the third switch T3 and the seventh switch T7. In variant, it is possible to simultaneously close the first switch T1, the second switch T2, the fourth switch T4 and the seventh switch T7.

Since the three capacitors C1, C2 and C3 share the same information, the processing circuit 5 can read the information on the first capacitor C1 or on the second capacitor C2. The reading of data in the first and/or the second capacitors (C1, C2) can be carried out during the acquisition of new data in capacitor C3.

In this configuration, it is possible to control the first and third switches T1 and T3 in synchronism. It may be the same for the second and fourth switches T2 and T4. It is also possible to continuously leave first or third switch in the open state. In this last case, it is also advantageous to continuously leave the second and fourth switches in the closed state.

As in a previous embodiment, it is possible to condition the acquisition of new data to the reading of previous data by resetting capacitor C3 during the time where the information in capacitors C1 and/or C2 is read.

In a new mode of operation with a gain different from the previous embodiments, acquisition of data is divided into two periods P1 and P2. The values of the two periods are chosen according to the value of electrical capacity of two capacitors C1 and C2, so that if an identical current is provided on periods P1 and P2, an identical voltage is present at the terminals of the two capacitors C1 and C2, i.e. $C1/P1=C2/P2$.

This embodiment is particularly advantageous if $C1=C2$ because then $P1=P2$ which facilitates the implementation of the detection device. The gain of this configuration is $q/(2*(C1+C3))$ or $q/(C1+C2+2*C3)$.

During a first time period, the third capacitor C3 is reset by simultaneously closing the fifth and seventh switches T5 and T7. This first period is illustrated in FIG. 14.

In a second time period, the seventh switch T7 is closed and the first and third switches T1 and T3 are open which allows a storage of electrical charges in capacitor C3 only. This second period is illustrated in FIG. 15.

In a third period, the first switch T1 is closed at the same time as seventh switch T7 to achieve a balance of charges between capacitors C1 and C3. This third period is illustrated in FIG. 17.

In a fourth period, the capacitor C1 is then decoupled from capacitor C3 by opening the first switch T1.

In a fifth period, the capacitor C3 is then reset by simultaneously closing the fifth and seventh switches T5 and T7 (FIG. 14).

In a sixth period, the seventh switch T7 is closed and the first and third switches T1 and T3 are open which allows a storage of electrical charges in capacitor C3 only (FIG. 15).

Figure 19:
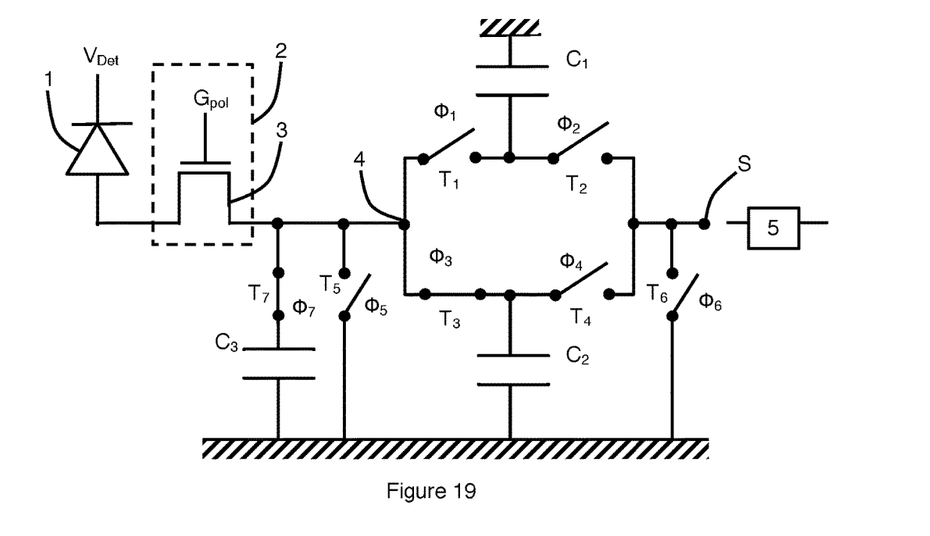
FIGS. 19 and 20 represent, schematically, a specific seventh mode of operation of a detection circuit according to the invention.

In a seventh period illustrated in FIG. 19, the third switch T3 is closed at the same time as seventh switch T7 so as to achieve a balance of charges between capacitors C2 and C3.

Figure 20:
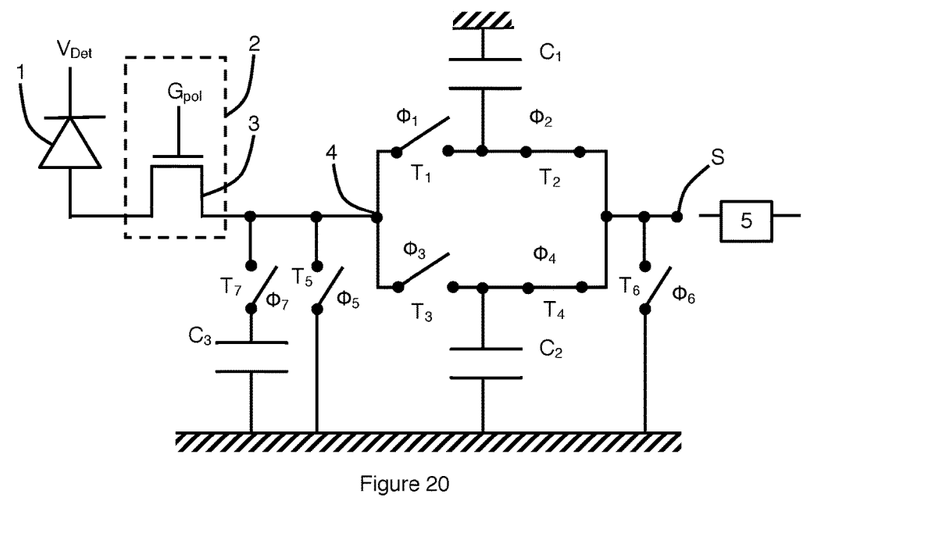

In an eighth period illustrated in FIG. 20, the capacitors C1 and C2 are parallel mounted by opening the first and third switches and by closing the second and fourth switches. The connection of the capacitors C1 and C2 achieves a balance of electrical charges. The first phase of acquisition is stored in first capacitor C1, the second phase of acquisition is stored in second capacitor C2.

The information stored in first capacitor C1 and in the second capacitor C2 is read by the processing circuit 5.

This embodiment is particularly advantageous, because, if the current is constant over the two phases of the acquisition, the noise of the signal is divided by $\sqrt{2}$. The signal-to-noise ratio corresponds with a design having a equivalent capacitor equal to $C3+C2+C3+C1$ while the design consists of a capacitor C3 and a capacitor C1 and a capacitor C2. In the first phase, Q1 charges are stored in capacitors C1 and C3. The voltage is then Q1/(C1+C3). In the second phase, Q2 charges are stored in C2 and C3. The voltage is then Q2/(C2+C3). C1 and C2 are mounted in parallel to allow a balance of charges. If Q1=Q2 and C1=C2, we note that the measured voltage does not move when balancing but the noise is divided by $\sqrt{2}$.

Following this reading, the information stored in first capacitor C1 and in second capacitor C2 is erased by closing sixth switch T6 simultaneously with second switch T2 and with fourth switch T4. The first switch T1 is opened in order not to erase data present in third capacitor C3. It is also possible to erase data on first capacitor C1 and then data of the second capacitor C2 or vice versa.

The detector 1 transforming a light radiation into an electrical current, a photodetector, can be, for example, a photodiode which is advantageously reverse biased to generate a current. As an example, the detector 1 is associated with the LWIR wavelength range between 8 and 14 μm. For a LWIR wavelength, the photodetector generally operates at a temperature of 77K. The detector 1 may also be associated with the MWIR wavelength range between 3 and 5 μm. In this range, the photodetector generally operates to a temperature between 130 k and 200K.

In this way, the current issued by detector 1 successively passes through the control transistor 2 by its first and second input/output terminals to reach capacitors C1, C2 and/or C3.

In a advantageous embodiment, the processing circuit 5 is shared, for example the processing circuit is connected to four pixels by means of four switches. The acquisition of the data can be carried simultaneously for all pixels and reading of data is carried out successively, i.e. one pixel after the other.

In order to implement the various modes of operation described, the detection device includes the means for controlling the switches that command the synchronisation of the openings and closures of the various switches. For reasons of clarity, the means for controlling the electronic switches are represented by the signals associated with switches.

The different switches can be carried by transistors, for example, field effect transistors.

The duration of integration corresponding to the duration of the transfer of charges from photodetector 1 towards one of the capacitors is of the order of $1.10^{-3}$ s, which allows to reach reading frequencies of the order of 1 kHz.

It is possible to use a higher number of capacitors to obtain a circuit with a greater number of different gains. Then it is advantageous to place an additional capacitor in the derivation of the third capacitor. It is also possible to add a new transit line in derivation of the previous two. This new transit line comprises two switches series mounted and the additional capacitor is connected on the one hand to a specific voltage source and on the other hand between the two switches.

The number of capacitors can be even or odd.

The invention claimed is:

1. Detection device, comprising
a photodetector,
a biasing circuit configured to bias the photodetector,
an integration capacitive load configured to store electrical charges emitted by the photodetector,
an output terminal coupled to the integration capacitive load and designed to be connected to a processing circuit,
wherein the integration capacitive load is configured to present different values of electrical capacity, the integration capacitive load comprising:
at least first and second transit lines branch mounted between the photodetector and the output terminal, the first transit line including first and second switches mounted in series, the second transit line comprising third and fourth switches mounted in series,
a first capacitor having a first electrode connected between the first and second switches and a second electrode connected to a first source of predefined voltage,
a second capacitor having a first electrode connected between the third and fourth switches and a second electrode connected to a second source of predefined voltage,
a third capacitor mounted in series with an additional switch between a third source of predefined voltage and a connection between the first switch and the third switch,
a circuitry configured to reset independently the first capacitor, the second capacitor and the third capacitor.

2. Detection device according to claim 1, wherein the first source of predefined voltage, the second source of predefined voltage and the third source of predefined voltage are a single source of predefined voltage configured to provide a same voltage to the first, second and third capacitors and wherein the circuitry configured to reset independently the first capacitor, the second capacitor and the third capacitor includes
a fifth switch connected in parallel with a series circuitry formed by the third capacitor mounted in series with the additional switch, and
a sixth switch connected between the single source of the predefined voltage and the output terminal.

3. Detection device according to claim 1, comprising a control circuit configured to control the first, second third and fourth switches so that
charges emitted by the photodetector are stored in the third capacitor,
the stored charges are transferred in the first and second capacitors which mounted in parallel,
the processing circuit reads an information stored in first capacitor and/or in the second capacitor.

4. Detection device according to claim 3, wherein the control circuit is configured to authorise reading by the processing circuit during at least one portion of a time period wherein the third capacitor is coupled to the photodetector so that the third capacitor stores charges from the photodetector.

5. Detection device according to claim 4, wherein the control circuit is configured to reset the first and second capacitors during at least one portion of the time period wherein the third capacitor is coupled to the photodetector so that the third capacitor stores charges from the photodetector.

6. Detection device according claim 1, comprising a control circuit configured to:
connect the third capacitor to the photodetector so that the charges emitted by the photodetector are stored in the third capacitor,
transfer the stored charges from the third capacitor to the first capacitor,
reset the third capacitor,
connect the third capacitor to the photodetector so that the charges emitted by the photodetector are stored in the third capacitor, transfer the stored charges from the third capacitor to first capacitor and the second capacitor mounted in parallel with the first capacitor, and wherein the control circuit is configured to successively authorize the processing circuit to read an information stored in the first capacitor and an information stored in first and second capacitors.

7. Detection device according to claim 1, comprising a control circuit configured to:

connect the third capacitor to the photodetector so that the charges emitted by the photodetector are stored in the third capacitor, in a first step, transfer the stored charges from the third capacitor to the first capacitor, in a second step, reset the third capacitor, in a third step, connect the third capacitor to the photodetector so that the charges emitted by the photodetector are stored in the third capacitor, in a fourth step, transfer the stored charges from the third capacitor to the second capacitor, in a fifth step, and wherein the control circuit is configured to successively authorize the processing circuit to read an information stored in the first capacitor during at least one portion of the fourth step and an information stored in first and second capacitors during at least one portion of the first step.

8. Detection device according to claim 1, wherein a value of the electrical capacity of the first capacitor is equal to a value of the electrical capacity of the second capacitor.

9. Detection device according to claim 1, comprising a single output terminal.

10. Detection device according to claim 1, wherein the output terminal is defined by a terminal common to the second and fourth transistors.

11. Detection device according to claim 1, wherein the third capacitor is connected only to the output terminal by means of the first and second transit lines.

* * * * *